United States Patent
Zingler

(10) Patent No.: US 10,334,490 B2
(45) Date of Patent: Jun. 25, 2019

(54) OVERALL NETWORK PERFORMANCE AND/OR OVERALL QUALITY OF SERVICE OF A MOBILE COMMUNICATION NETWORK BY ASSIGNING A PHYSICAL CELL IDENTIFIER INFORMATION TO A PLURALITY OF RADIO CELLS

(71) Applicant: Deutsche Telekom AG, Bonn (DE)

(72) Inventor: Olaf Zingler, Bonn (DE)

(73) Assignee: DEUTSCHE TELEKOM AG, Bonn (DE)

( * ) Notice: Subject to any disclaimer, the term of this patent is extended or adjusted under 35 U.S.C. 154(b) by 0 days.

(21) Appl. No.: 15/554,716

(22) PCT Filed: Feb. 12, 2016

(86) PCT No.: PCT/EP2016/052971
§ 371 (c)(1),
(2) Date: Aug. 31, 2017

(87) PCT Pub. No.: WO2016/142121
PCT Pub. Date: Sep. 15, 2016

(65) Prior Publication Data
US 2018/0279187 A1    Sep. 27, 2018

(30) Foreign Application Priority Data

Mar. 10, 2015  (EP) .................... 15158420

(51) Int. Cl.
*H04W 24/02*  (2009.01)
*H04W 36/00*  (2009.01)
*H04W 36/08*  (2009.01)

(52) U.S. Cl.
CPC ....... *H04W 36/0083* (2013.01); *H04W 24/02* (2013.01); *H04W 36/08* (2013.01)

(58) Field of Classification Search
CPC .. H04W 36/0083; H04W 24/02; H04W 36/08
(Continued)

(56) References Cited

U.S. PATENT DOCUMENTS 9,319,872 B1 * 4/2016 Malreddy ............. H04W 24/02
2006/0126563 A1 * 6/2006 Kang ................ H04W 36/0011
                                                        370/331
(Continued)

OTHER PUBLICATIONS

Fafoutis et al, Handover Incentives for Self-interested WLANs with Overlapping Coverage, 2012, IEEE. (Year: 2012).*

(Continued)

*Primary Examiner* — Christopher R Crompton
(74) *Attorney, Agent, or Firm* — Leydig, Voit & Mayer, Ltd.

(57) ABSTRACT

A method for improving overall network performance and/or overall quality of service of a mobile communication network by assigning physical cell identifier information to a plurality of radio cells includes: in a first step and for each of a plurality of coverage area elements of a common radio coverage area, generating a set of handover likelihood information; in a second step, calculating, based on elements of the sets of handover likelihood information, an overlap score value indicative of the overlap between at least one source radio cell and at least one target radio cell; and in a third step, assigning the physical cell identifier information to the at least one source radio cell and/or the at least one target radio cell dependent on the overlap score value.

12 Claims, 1 Drawing Sheet

(58) Field of Classification Search
USPC .......................................................... 370/331
See application file for complete search history.

(56) References Cited

U.S. PATENT DOCUMENTS

| | | | |
|---|---|---|---|
| 2010/0178912 A1 | 7/2010 | Gunnarsson et al. | |
| 2010/0267387 A1* | 10/2010 | Stephens ............... | H04W 36/22 455/436 |
| 2014/0099964 A1* | 4/2014 | Lee ....................... | H04W 16/18 455/448 |
| 2014/0161103 A1* | 6/2014 | Sirotkin ................ | H04W 24/10 370/332 |
| 2014/0369285 A1* | 12/2014 | Li ......................... | H04W 24/02 370/329 |
| 2016/0119932 A1* | 4/2016 | Cui ....................... | H04L 41/0816 370/255 |
| 2016/0204905 A1* | 7/2016 | Lee ....................... | H04L 1/1812 370/329 |

OTHER PUBLICATIONS

Pahal et al, A Prediction Based Handover Trigger in Overlapped Heterogeneous Wireless Networks, 2013, IEEE. (Year: 2013).*

Ismail et al, The Performance of Intra and Inter Handover with Overlapping Cell in LTE based Network, Aug. 2013, IEEE. (Year: 2013).*

Yan et al, A Prediction-Based Handover Trigger Time Selection Strategy in Varying Network Overlapping Environment, 2011, IEEE. (Year: 2011).*

Huawei: "Correction for Neighbour Info IE (EARFCN)", 3GPP Draft; R3-083351 Earfcninneighbourinfoie, $3^{rd}$ Generation Partnership Project (3GPP), Mobile Competence Centre; 650, Route Des Lucioles; F-06921 Sophia-Antipolis Cedex; France, vol. RAN WG3, No. Prague, Czech Republic; Nov. 10, 2008-Nov. 14, 2008, Nov. 5, 2008 (Nov. 5, 2008), XP050609719.

* cited by examiner

OVERALL NETWORK PERFORMANCE AND/OR OVERALL QUALITY OF SERVICE OF A MOBILE COMMUNICATION NETWORK BY ASSIGNING A PHYSICAL CELL IDENTIFIER INFORMATION TO A PLURALITY OF RADIO CELLS

CROSS-REFERENCE TO RELATED APPLICATIONS

This application is a U.S. National Phase application under 35 U.S.C. § 371 of International Application No. PCT/EP2016/052971, filed on Feb. 12, 2016, and claims benefit to European Patent Application No. EP 15158420.8, filed on Mar. 10, 2015. The International Application was published in English on Sep. 15, 2016, as WO 2016/142121 A1 under PCT Article 21(2).

FIELD

The present invention relates a method for improving overall network performance and/or overall quality of service of a mobile communication network by assigning physical cell identifier information to a plurality of radio cells.

Furthermore, the present invention relates to a system and a mobile communication network for improving overall network performance and/or overall quality of service of a mobile communication network by assigning physical cell identifier information to a plurality of radio cells.

Furthermore, the present invention relates to a program and to a computer program product for improving overall network performance and/or overall quality of service of a mobile communication network by assigning physical cell identifier information to a plurality of radio cells.

The present invention relates to the area of cell-related planning and optimization of mobile networks or mobile communication networks. Mobile communication networks typically use one standard or a plurality of standards for mobile communication such as the so-called GSM standard (Global System for Mobile communication), the GPRS standard (General Packet Radio System), the UMTS standard (Universal Mobile Telecommunication System) or the LTE (Long-Term Evolution) standard.

BACKGROUND

For the LTE standard and as well for the UMTS standard, so-called ANR functionalities (Automatic Neighbor Relationship) have been standardized by the relevant standardization organization (3GPP) to identify and organize neighbor relationships among cells which is the basis for mobility of mobile devices (user equipments) within the mobile communication network or parts thereof.

One basic pre-requisite and assumption for the use of ANR functionalities, but generally also for mobility of user equipments within the mobile communication network, is that cell identification information being assigned, by the operator of the mobile communication network, to a radio cell is unique, and hence it is possible to identify that radio cell, at least on a local level (i.e. not necessarily network-wide) via that identification information. This information is often referred to as the so-called physical cell identifier information or PCI (Physical Cell Identifier): it identifies the radio cell of the mobile communication network as a short identifier but, at least in general, it is not (necessarily) unique regarding the complete mobile communication network (i.e. network-wide).

At the very least, this assumption should be verified—in view of using ANR functionalities—that the pair of values of:

the physical cell identifier information, and
the center frequency is locally unique in order to be able to identify that radio cell, i.e. on a local level within the mobile communication network (i.e. not necessarily network-wide). As a consequence, it should be possible to unambiguously identify any radio cell via the physical cell identifier information and the center frequency.

However, due to the fact that the number of possible physical cell identifier values (e.g. 504 different values according to the LTE standard)—as well as the number of possible values of the downlink primary scrambling code (e.g. 512 different values according to the UMTS standard) is limited, and especially in complex network situations, e.g. involving a plurality of network layers, the problem of confusion and/or of conflicts regarding the physical cell identifier information (or downlink primary scrambling code) and/or regarding the pair of values of the physical cell identifier information (or downlink primary scrambling code) and the center frequency (so-called PCI confusions or PCI conflicts) occur, especially in case that a plurality of different frequency bands (such as the LTE800 frequency band and the LTE1800 frequency band) are used, and no neighbor relation planning is performed, e.g. upon or during the deployment of the mobile communication network.

In contrast to the physical cell identifier information assigned to the radio cells of the mobile communication network, the cell global identifier information (also called CGI, Cell Global Identifier) is a unique identifier for a radio cell, i.e. its knowledge enables precisely identifying the radio cell (at least network-wide, if not globally). However, the cell global identifier information is more extensive and coded in a different manner within the signaling data than the physical cell identifier information (typically being "longer", i.e. comprising a higher number of digits) and, especially due to this property, is not read (i.e. decoded or received), by a standard user equipment, in any case, just for the purposes of normal mobility measurements, i.e. in case that the user equipment detects that the radio link with the serving base station entity becomes weaker (and the radio signals of another base station entity of another radio cell becomes stronger) and hence a handover procedure could be required.

Accordingly, situations of confusion and/or of conflicts regarding the physical cell identifier information (and/or regarding the physical cell identifier information and the center frequency) often result in a reduced level of quality of service provided by the mobile communication network to the respective users of the mobile devices or user equipments, lead to a reduced mobility in the mobile communication network and might end up in a dropped connection of the mobile device or user equipment.

In the context of the so-called self-organized network (SON), ANR (Automatic Neighbor Relationship) functionalities are conducted, according to which measurements are performed such that neighbor relations of radio cells are configured automatically, especially based on measurement results received from user equipments. Typically, the information of the identified neighbor radio cells (their used absolute radio frequency channel number (ARFCN), i.e. their center frequency, their physical cell identifier information, their cell global identifier and the IP-address of the connected eNodeB) are stored in lists, like, a list comprising all external neighbor radio cells (neighbor cell list, NCL) of base station entity or an eNodeB, or on cell level in a neighbored cell relations list/table (NRT). To speed up the handover process, usually the measured pair of the center frequency and the physical cell identifier information (ARFCN/PCI) is compared with the available entries in the NRT-list and/or the NCL-list and a handover is trigged to the matching entry. In the context of the present invention, this matching entry is called the target cell. Generally, based on this method, it is requested that the condition be fulfilled that unique pairs of ARFCN/PCI should be present in such a list or such lists, and, of course, to use also within the own cell (source cell) a PCI which is not used in such a list neither. If these requirements are fulfilled (e.g. due to an already configured neighbor relation NRT of the respective radio cells), the base station entity (or eNodeB) of the source radio cell can distinguish the reported measurements from a user equipment and trigger the handover procedure to the correct target cell. However, this is not the case if a possible (other) target radio cell is also a possible handover candidate (due to geographic and/or radio conditions) but has assigned the same pair of ARFCN/PCI than the another possible target radio cell, e.g. due to the fact that it has not yet been identified by the ANR functionality as a possible neighbor relation.

SUMMARY

In an exemplary embodiment, the present invention provides a method for improving overall network performance and/or overall quality of service of a mobile communication network by assigning physical cell identifier information to a plurality of radio cells. The mobile communication network comprises a core network and an access network, the access network comprising the plurality radio cells, wherein the plurality of radio cells are at least partly overlapping, forming a common radio coverage area, each radio cell of the plurality of radio cells being associated with a respective base station entity of a plurality of base station entities, each radio cell of the plurality of radio cells using a center frequency, and a unique cell global identifier information being assigned to each radio cell of the plurality of radio cells. The method includes the following steps: in a first step and for each of a plurality of coverage area elements of the common radio coverage area, generating a set of handover likelihood information—regarding possible inter-frequency handover events between at least part of the plurality of radio cells and based on the estimated radio signal quality at or within the considered coverage area element—each element of the set of handover likelihood information being indicative of the possibility and/or the likelihood of a handover of the user equipment from at least one possible source radio cell of the plurality of radio cells to at least one possible target radio cell of the plurality of radio cells, the at least one source radio cell and the at least one target radio cell having, respectively, center frequencies in different frequency bands; in a second step, calculating, based on the elements of the sets of handover likelihood information— among the sets of handover likelihood information associated with the plurality of coverage area elements of the common radio coverage area—related to the at least one source radio cell and the at least one target radio cell, an overlap score value indicative of the overlap between the at least one source radio cell and the at least one target radio cell; and in a third step, assigning the physical cell identifier information to the at least one source radio cell and/or the at least one target radio cell dependent on the overlap score value.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
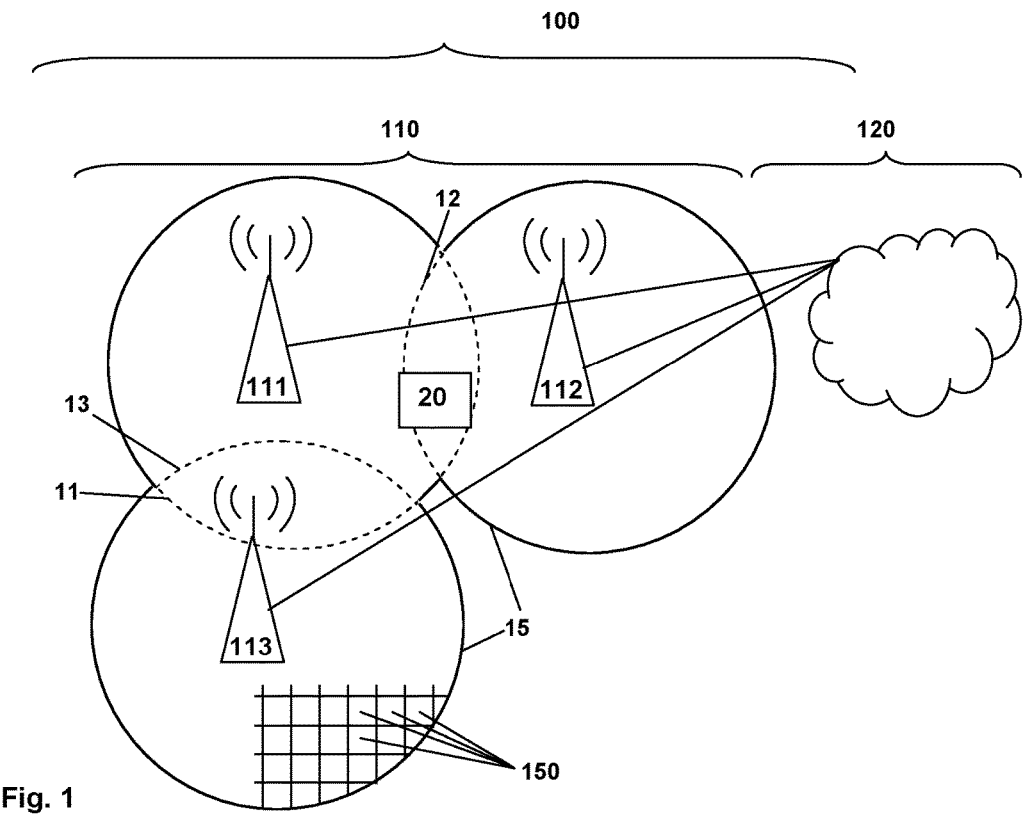
FIG. 1 schematically illustrates a mobile communication network comprising a multitude of radio cells being served by a multitude of base station entities, and a user equipment being served by the serving base station entity, the other base station entities being potential target base station entities for a handover procedure involving the user equipment.

Exemplary embodiments of the present invention provide an effective solution to avoid situations of confusion and/or of conflicts regarding the physical cell identifier information (and/or regarding the physical cell identifier information and the center frequency) and thereby improving overall network performance and/or overall quality of service as well as reducing the time needed to perform the handover procedure, and reducing battery drain of mobile devices in situations or circumstances where this can be avoided.

Exemplary embodiments of the present invention provide a method for improving overall network performance and/or overall quality of service of a mobile communication network by assigning physical cell identifier information to a plurality of radio cells, wherein the mobile communication network comprises a core network and an access network, the access network comprising the plurality radio cells, wherein the plurality of radio cells are at least partly overlapping, forming a common radio coverage area, each radio cell of the plurality of radio cells being associated to a base station entity of a plurality of base station entities, each radio cell of the plurality of radio cells using a center frequency, and unique cell global identifier information being assigned to each radio cell of the plurality of radio cells, wherein the method comprises the following steps:

in a first step and for each of a plurality of coverage area elements of the common radio coverage area, a set of handover likelihood information is generated—regarding possible inter-frequency handover events between at least part of the plurality of radio cells and based on the estimated radio signal quality at or within the considered coverage area element—an element of the set of handover likelihood information being indicative of the possibility and/or the likelihood of a handover of the user equipment from at least one possible source radio cell of the plurality of radio cells to at least one possible target radio cell of the plurality of radio cells, the at least one source radio cell and the at least one target radio cell having, respectively, center frequencies in different frequency bands, in a second step, based on the elements of the sets of handover likelihood information—among the sets of handover likelihood information associated to the plurality of coverage area elements of the common radio coverage area—related to the at least one source radio cell and the at least one target radio cell, an overlap score value is calculated being indicative of the overlap between the at least one source radio cell and the at least one target radio cell, in a third step, the physical cell identifier information is assigned to the at least one source radio cell and/or the at least one target radio cell dependent on the overlap score value.

It is thereby advantageously possible according to the present invention that situations of confusion and/or of conflicts regarding the physical cell identifier information (and/or regarding the physical cell identifier information and the center frequency) can be avoided as much as possible, and hence the overall network performance and/or overall quality of service as well as the battery usage of mobile devices can be enhanced (especially via increasing the cases of error-free forwarding of user equipments to the target cell that has been measured by the user equipment).

According to the present invention, the term "physical cell identifier" or "physical cell identifier information" is meant to refer to the physical cell identifier in case a radio access network according to the LTE standard (fourth generation mobile network) is considered. However, in case that a radio access network according to the UMTS standard (third generation mobile network) is considered, the term "physical cell identifier" or "physical cell identifier information" shall refer to the downlink primary scrambling code. This is because the respective roles, of the physical cell identifier information in case of an LTE network, and of the downlink primary scrambling code in case of a UMTS network are analogous—at least with respect to the possibility to differentiate radio cells of the mobile communication network (via different values of the physical cell identifier information, and the downlink primary scrambling code, respectively). However, the discussion presented in the following paragraphs of the disclosure is focused on the term "physical cell identifier" or "physical cell identifier information" and, correspondingly, to its application with a radio access network according to the LTE standard.

Typically, such problems or conflicts regarding the assignment of PCIs or physical cell identifier information (PCI problems/conflicts) are either called PCI confusions (meaning that the ARFCN/PCI is not unique in a target cell list (of a source radio cell)), or PCI collisions (meaning that the source radio cell and the target radio cell use the same combination of ARFCN and PCI).

These kinds of PCI conflicts can also occur in case that, e.g., a new radio cell is activated (deployed) in the coverage area of the source radio cell and having as a consequence that the new radio cell is not already considered in the target cell list of the source radio cell. Even in such a situation (i.e. in case of an existing PCI confusion), a user equipment can measure the newly deployed radio cell (in case the user equipment is located within the radio coverage area of the newly deployed radio cell), but based on the available NCL/NRT-entries of the source radio cell, the handover process will be triggered to the wrong target radio cell (which is already present in the target cell list of the source radio cell) using the same pair of ARFCN/PCI (as the newly deployed radio cell). Usually, such a handover procedure will fail and might end up in a call drop, if no other third alternative radio cell can be used.

Most of the known and commercially offered PCI planning and optimization algorithms try to avoid such situations with the consideration of the 2nd, 3rd etc. tier of neighbor relations or use the cell coordinates and/or main loop direction of the cells/antennas to calculate geometrical values, like distances between pairs of cells or in case of cells from the same frequency band they consider calculated interference probability values between pairs of LTE-cells (typically stored in a kind of interference matrix). However, in case that the mobile network operator of a mobile communication network fully uses or trusts the use of the ANR functionality, the above-mentioned specification for a user equipment—i.e. to receive (as completely as possible) only cells with a unique PCI (and ARFCN) within the coverage area of the source radio cell—is even more important. Thereby, it is possible to reduce formerly spent efforts directed to planning and/or optimization processes (where e.g. the planning step was typically performed by the usage of a radio network planning tool taking into consideration or comprising related neighbor planning algorithms), and to perform these tasks of network optimization and/or configuration instead with online collected measurement data from the life mobile communication network (i.e. the measurements typically conducted by user equipment using the mobile communication network).

In LTE networks (or parts thereof) that are configured such that all cells use the same LTE-frequency band, PCI conflicts can be typically avoided in current implementations of network equipment of RAN (radio access network) vendors. However, challenges regarding physical cell identifier conflicts still occur in inter-frequency cases (i.e. involving LTE networks (or parts thereof) that use more than one frequency band and, thus the possibility of inter-frequency handovers), where radio cells using different LTE frequency bands (configured ARFCN) are in contact with each other or are overlapping. Despite the fact that methods dealing with such situations are subject of at least one unpublished patent application of the applicant, (e.g. in case there is a significant reduction of handover performance figures, like the handover success rate, the CGI could be decoded for a certain number of handover events; with such CGI information, the report from the user equipment (triggering the handover event) can be compared with the stored entries of ARFCN/PCI and the corresponding CGI information, and, if needed, a new entry configured, triggering a PCI-optimization run in the following in case of an ARFCN/PCI-conflict), all these methods have the disadvantage that either a permanent CGI decoding has to be performed (with the connected disadvantage of additional process time (linked with a higher probability of handover failures), higher battery consumption, and additional signaling load), or, in case of an event triggered solution (of decoding the CGI information only in appropriate situations), that a certain amount of handover failures need to happen before the CGI-verification will be triggered in order to help to detect such conflicting situations. Furthermore, not all RAN equipment vendors are willing or able to implement such PCI/CGI-verification methods.

According to the present invention, it is advantageously possible to reduce such situations within the PCI planning process, i.e. the assignment of physical cell identifier information, respectively, to a plurality of radio cells of a mobile communication network, itself. Even if the above-mentioned specification (i.e. to have a unique PCI/ARFCN information (or pair of the physical cell identifier information and the center frequency used) of underlying network structures in the radio coverage area of a (source) radio cell)

might not be completely secured by the planning method (i.e. the method of assigning a physical cell identifier information) according to the present invention, the probability to fulfill this specification can be significantly improved. According to the present invention, the overlap between a pair of radio cells (using different LTE frequency bands) is calculated or determined and this calculated or determined value or ratio of overlap is used as an additional input criterion within the PCI planning/optimization process, i.e. the process of method of assigning a physical cell identifier information.

The thus calculated or determined overlap describes, in a way, the predicted area (of the source radio cell, i.e. of its assumed radio coverage area) where inter-frequency (handover) events can be potentially triggered (potentially leading, in the following, to a handover). According to the present invention, the calculated situations, potentially leading to a handover event, are determined with actually used LTE system criterions in mind, i.e. the criterions used by real user equipments performing measurements and triggering handovers based on the results of these measurements. The underlying basis of a network planning tool consists typically of field strength calculations or assumptions. These field strength calculations or assumption can be enhanced, in so-called tuned models, by real-world measurements that are taken into account. Nevertheless, a prediction error typically exists between the field strength calculations and/or assumptions within a network planning tool and the measured field strength a user equipment would encounter in reality. Therefore exemplary embodiments of the present invention consider additional offsets, e.g. to correct the LTE system criterions with planning (tool) specific offsets which reduce the impact of errors of the path-loss or field-strength prediction model.

Hence according to the present invention, an enhanced overall network performance and/or overall quality of service of a mobile communication network can be realized via assigning physical cell identifier information, respectively, to a plurality of radio cells within the mobile communication network. The mobile communication network comprises a core network and an access network, and the access network comprises a plurality radio cells. The plurality of radio cells are at least partly overlapping, thus forming a common radio coverage area where especially inter-frequency handover events might occur due to the radio cells being operated using radio frequencies of different frequency bands, especially different LTE frequency bands. Each radio cell of the plurality of radio cells is, of course, associated to a base station entity of a plurality of base station entities, and used a center frequency as well as unique cell global identifier information being assigned to the radio cell. According to the present invention, an exemplary embodiment of the inventive method includes, in a first step, a set of handover likelihood information is generated for each of a plurality of coverage area elements of the common radio coverage area. The set of handover likelihood information is generated regarding possible inter-frequency handover events between at least part of the plurality of radio cells and based on the estimated radio signal quality at or within the considered coverage area element, and an element of the set of handover likelihood information is indicative of the possibility and/or the likelihood of a handover of the user equipment from at least one possible source radio cell of the plurality of radio cells to at least one possible target radio cell of the plurality of radio cells, the at least one source radio cell and the at least one target radio cell having, respectively, center frequencies in different frequency bands. In a second step, an overlap score value is calculated being indicative of the overlap between the at least one source radio cell and the at least one target radio cell. The overlap score value is based on the respective elements (i.e. related to the at least one source radio cell and the at least one target radio cell) of the sets of handover likelihood information among the sets of handover likelihood information associated to the plurality of coverage area elements of the common radio coverage area. In a third step, the physical cell identifier information is assigned to the at least one source radio cell and/or the at least one target radio cell dependent on the overlap score value.

According to the present invention, it is advantageously possible that possible situations of PCI confusion can be anticipated such that continuous CGI measurements can be avoided as this would cost end customer performance, especially in terms of: DRX gaps, additional needed time of the procedure and battery power.

In the context of the present invention, cases of conflicting physical cell identifier information (relating to mobile communication networks according to the LTE standard) are referred to. However, in case of mobile communication networks according to the UMTS standard, the same type of conflict occurs with respect to primary downlink scrambling codes. According to the present invention, an application of an exemplary embodiment of the inventive method for mobile communication networks according to the UMTS standard can be realized via exchanging "physical cell identifier" or "(pair of) physical cell identifier and center frequency" by "primary downlink scrambling code" or "(pair of) primary downlink scrambling code and center frequency". Thus, in the context of the present invention, the physical cell identifier according to the LTE standard as well as the primary downlink scrambling codes according to the UMTS standard are both addressed when the term "physical cell identifier" or "physical cell identifier information" is used. Likewise, in case of mobile communication networks comprising network layers (i.e. radio cells being either potential source radio cells or target radio cells) according to the LTE standard and network layers (i.e. radio cells being either potential source radio cells or target radio cells) according to the UMTS standard, the same type of conflict occurs with respect to primary downlink scrambling codes and/or physical cell identifier information. According to the present invention, an application of an exemplary embodiment of the inventive method for mobile communication networks comprising network layers according to the LTE standard and according to the UMTS standard can be realized via exchanging "physical cell identifier" or "(pair of) physical cell identifier and center frequency" by "physical cell identifier/primary downlink scrambling code" or "(pair of) physical cell identifier and center frequency/(pair of) primary downlink scrambling code and center frequency".

According to the present invention it is preferred that the radio signal quality—related to a considered coverage area element of the common radio coverage area—based on which the set of handover likelihood information is generated, corresponds to the radio signal quality experienced by a user equipment in case it is located at or within the considered area element.

Thereby, it is advantageously possible that the set of handover likelihood information represents meaningful values related to the radio coverage of the respective radio cells within the common radio coverage area.

According to a further embodiment of the present invention, it is also possible and preferred that the possibility and/or the likelihood of a handover—related to a considered coverage area element of the common radio coverage area—from a possible source radio cell to a possible target radio cell of the plurality of radio cells is assumed to be verified if the estimated value of the reference signal received power (RSRP) verifies common threshold conditions typically checked—by user equipments—upon handover events, especially a reference signal received power of lower than or equal to −110 dBm for the possible source radio cell and a reference signal received power of higher than or equal to −105 dBm, or a reference signal received power of lower than or equal to the sum of a first offset value and −110 dBm for the possible source radio cell and a reference signal received power of higher than or equal to the sum a second offset value and −105 dBm.

According to a further embodiment of the present invention, it is also possible and preferred that the possibility and/or the likelihood of a handover—related to a considered coverage area element of the common radio coverage area—from a possible source radio cell to a possible target radio cell of the plurality of radio cells is assumed to be verified if the estimated value of the reference signal received power (RSRP) verifies common threshold conditions typically checked upon handover events, especially a reference signal received power of lower than or equal to −110 dBm for the possible source radio cell and a reference signal received power of a possible target radio cell is equal or better than 5 dB of the reference signal of the possible source radio cell, or a reference signal received power of lower than or equal to the sum of a first offset value and −110 dBm for the possible source radio cell and a reference signal received power of a possible target radio cell is equal or better than the sum of a second offset value and 5 dB in relation to a reference signal of the possible source radio cell.

According to the present invention it is furthermore preferred that the possibility and/or the likelihood of a handover—related to a considered coverage area element of the common radio coverage area—from a possible source radio cell to a possible target radio cell of the plurality of radio cells is assumed to be verified if the estimated value of the reference signal received power (RSRP) verifies modified common threshold conditions typically checked—by user equipments—upon handover events, wherein the modified common threshold conditions are modified to reflect special radio signal quality influencing conditions, especially an additional loss of radio signal quality due to indoor conditions within at least part of the considered coverage area element.

It is thereby advantageously possible according to the present invention that—especially regarding specific areas within the common radio coverage area that are known to be built or having a comparatively high proportion of indoor traffic—such a typical use case of the respective area is considered.

According to a further preferred embodiment of the present invention, the set of handover likelihood information, generated with respect to a considered coverage area element of the common radio coverage area, comprises a weighting factor, the weighting factor being dependent on at least one out of the following:
the number of user equipments in the coverage area element,
an indication of the density of user equipments in the coverage area element in relation to the total amount of user equipments in the considered access network,
an indication related to the amount or to the density of real time traffic in the coverage area element,
an indication related to the amount or to the density of non-real time traffic in the coverage area element,
an indication of the population or the density of population in the coverage area element,
an indication related to the digital land usage in the coverage area element,
an indication related to the mobility of the user equipments in the coverage area element,
a vector data set in the coverage area element, especially related to a street and/or a motorway and/or a train line
an indication related to the type of the source radio and/or to the type of the target radio cell and/or an indication related to the type of the relationship between the source and target radio cell.

Thereby, it is advantageously possible to adjust or influence the computation of the overlap score value such as to assure that important handover relations between source and target radio cells are sufficiently taken into consideration with respect to parameters such as, e.g., the number of user equipments or the density of user equipments in the coverage area element, the digital land usage in the coverage area element, etc.

According to the present invention it is furthermore preferred that for each of the plurality of coverage area elements, the set of handover likelihood information comprises at least one element of handover likelihood information related to the one radio cell of the plurality of radio cells, as a possible source radio cell, that has the highest estimated value of radio signal quality.

It is thereby advantageously possible that the respective potential source radio cell corresponds to the radio cell having—from the perspective of a user equipment within a coverage area element—the highest estimated value of radio signal quality. According to the present invention, the radio cells of each relevant frequency band used are such potential source radio cells or serving cells, i.e. for a computation of specific overlap score values, only such radio cells which belongs to one specific layer (or (LTE) frequency band) are considered. The global calculation (and the resulting assignment of physical cell identifier information) is done for each frequency band/RAT combination as serving layer individual as long as there is a further target layer with cells with a lower priority.

According to a further preferred embodiment of the present invention, for each of the plurality of coverage area elements, the set of handover likelihood information comprises
additionally to the one element of handover likelihood information related to the one radio cell that has the highest estimated value of radio signal quality—at least one element of handover likelihood information related to a possible source radio cell of the plurality of radio cells if at least one of the following conditions are fulfilled:
the difference between the estimated value of radio signal quality related to the possible source radio cell of the plurality of radio cells compared to the highest estimated value of radio signal quality of a radio cell within the same frequency band is less than a predetermined threshold of radio signal quality,
the number of possible source radio cells within the same frequency band for which at least one element of handover likelihood information is generated does not exceed a predetermined threshold number.

It is thereby advantageously possible to effectively limit the time and efforts used to conduct the first and second step according to the present invention, especially the generation of the set of handover likelihood information and the calculation of the overlap score value.

According to still a further preferred embodiment of the present invention, different elements of handover likelihood information of a set of handover likelihood information—related to a considered coverage area element of the common radio coverage area—comprise a cell assignment probability weighting factor, the cell assignment probability weighting factor increasing or decreasing the respective overlap score value in case that more than one element of handover likelihood information is generated, for a considered coverage area element of the common radio coverage area, for radio cells within one frequency band.

According to the present invention it is furthermore preferred that the physical cell identifier information is assigned such that at least two possible target radio cells—having the same frequency band and being related to the same source radio cell—shall be assigned different physical cell identifier information in case that the respective overlap score value exceeds a predetermined maximum allowed overlap score threshold and/or the sum of the respective overlap score values exceeds a predetermined maximum allowed overlap score threshold or the sum of the respective overlap score values exceeds a predetermined maximum allowed overlap score threshold, whereby each overlap score has to be larger than a further minimum threshold, and/or a mathematical algorithm for the purpose of physical cell identifier planning and or optimization calculates this according to an implemented mathematical cost-function whereby the overlap score is the input parameter or is a part of the input parameters of this cost-function.

Furthermore, the present invention relates to a system for improving overall network performance and/or overall quality of service of a mobile communication network by assigning a physical cell identifier information to a plurality of radio cells, wherein the mobile communication network comprises a core network and an access network, the access network comprising the plurality radio cells, wherein the plurality of radio cells are at least partly overlapping, forming a common radio coverage area, each radio cell of the plurality of radio cells being associated to a base station entity of a plurality of base station entities, each radio cell of the plurality of radio cells using a center frequency, and unique cell global identifier information being assigned to each radio cell of the plurality of radio cells, wherein the system is configured such that:

for each of a plurality of coverage area elements of the common radio coverage area, a set of handover likelihood information is generated—regarding possible inter-frequency handover events between at least part of the plurality of radio cells and based on the estimated radio signal quality at or within the considered coverage area element—an element of the set of handover likelihood information being indicative of the possibility and/or the likelihood of a handover of the user equipment from at least one possible source radio cell of the plurality of radio cells to at least one possible target radio cell of the plurality of radio cells, the at least one source radio cell and the at least one target radio cell having, respectively, center frequencies in different frequency bands, based on the elements of the sets of handover likelihood information—among the sets of handover likelihood information associated to the plurality of coverage area elements of the common radio coverage area—related to the at least one source radio cell and the at least one target radio cell, an overlap score value is calculated being indicative of the overlap between the at least one source radio cell and the at least one target radio cell, the physical cell identifier information is assigned to the at least one source radio cell and/or the at least one target radio cell dependent on the overlap score value.

Thereby, it is advantageously possible to provide a system that avoids situations of confusion and/or of conflicts regarding the physical cell identifier information (and/or regarding the physical cell identifier information and the center frequency) in an effective manner, and enhance the overall network performance and/or overall quality of service as well as the battery usage of mobile devices.

Furthermore, the present invention relates to a mobile communication network for improving overall network performance and/or overall quality of service of a mobile communication network by assigning physical cell identifier information to a plurality of radio cells, wherein the mobile communication network comprises a core network and an access network, the access network comprising the plurality radio cells, wherein the plurality of radio cells are at least partly overlapping, forming a common radio coverage area, each radio cell of the plurality of radio cells being associated to a base station entity of a plurality of base station entities, each radio cell of the plurality of radio cells using a center frequency, and unique cell global identifier information being assigned to each radio cell of the plurality of radio cells, wherein the mobile communication network is configured such that:

for each of a plurality of coverage area elements of the common radio coverage area, a set of handover likelihood information is generated—regarding possible inter-frequency handover events between at least part of the plurality of radio cells and based on the estimated radio signal quality at or within the considered coverage area element—an element of the set of handover likelihood information being indicative of the possibility and/or the likelihood of a handover of the user equipment from at least one possible source radio cell of the plurality of radio cells to at least one possible target radio cell of the plurality of radio cells, the at least one source radio cell and the at least one target radio cell having, respectively, center frequencies in different frequency bands, based on the elements of the sets of handover likelihood information—among the sets of handover likelihood information associated to the plurality of coverage area elements of the common radio coverage area—related to the at least one source radio cell and the at least one target radio cell, an overlap score value is calculated being indicative of the overlap between the at least one source radio cell and the at least one target radio cell, the physical cell identifier information is assigned to the at least one source radio cell and/or the at least one target radio cell dependent on the overlap score value.

Thereby, it is advantageously possible to provide a mobile communication network adapted to avoid situations of confusion and/or of conflicts regarding the physical cell identifier information (and/or regarding the physical cell identifier information and the center frequency) in an effective manner.

Additionally, the present invention relates to a program comprising a computer readable program code which, when executed on a computer or on a network node of a mobile communication network, or in part on the computer and in part on the network node of the mobile communication network, causes the computer or the network node of the mobile communication network to perform an exemplary embodiment of the inventive method.

Still additionally, the present invention relates to a computer program product for operating a system or a mobile communication network, the computer program product comprising a computer program stored on a storage medium, the computer program comprising program code which, when executed on a computer or on a network node of a mobile communication network, or in part on the computer and in part on the network node of the mobile communication network, causes the computer or the network node of the mobile communication network to perform the an exemplary embodiment of inventive method.

These and other characteristics, features and advantages of the present invention will become apparent from the following detailed description, taken in conjunction with the accompanying drawings, which illustrate, by way of example, the principles of the invention. The description is given for the sake of example only, without limiting the scope of the invention. The reference figures quoted below refer to the attached drawings.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes.

Where an indefinite or definite article is used when referring to a singular noun, e.g. "a", "an", "the", this includes a plural of that noun unless something else is specifically stated.

Furthermore, the terms first, second, third and the like in the description and in the claims are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

In FIG. 1, a mobile communication network 100, especially a public land mobile network, is schematically shown, the mobile communication network 100 comprising an access network 110 and a core network 120. The mobile communication network 100 is preferably a cellular telecommunications network comprising typically a plurality of network cells, wherein three radio cells are represented in FIG. 1 by means of reference signs 11, 12, and 13: a first radio cell 11, a second radio cell 12, and a third radio cell 13. The access network 110 comprises at least one base station entity 111 serving a user equipment 20, wherein the first radio cell 11 corresponds to a serving (or source) radio cell of the user equipment 20 and is associated to the base station entity 111. The first radio cell 11 corresponds to the radio coverage area of the base station entity 111. The second, and third radio cells are likewise radio cells and are located in the vicinity of the serving or first radio cell 11 and having respective radio coverage areas that are represented in FIG. 1 as partly overlapping with the radio coverage area of the first radio cell 11. Together, the first, second and third radio cells 11, 12, 13 form a common radio coverage area 15. The common radio coverage area 15 is schematically represented by a drawn-through line in FIG. 1, whereas the first, second and third radio cells 11, 12, 13 (or their respective coverage areas) are (individually) represented by a dashed line. Especially, the first radio cell or source radio cell uses a different frequency band compared to the frequency band used by the second and third radio cell 12, 13. The frequency band used by the second radio cell 12 can either be the same frequency band as the frequency band used by the third radio cell 13, or it can be a different one (but still different to the frequency band used by the first radio cell 11). However, the present invention relates to a method to avoid a confusing situation that is caused by the assignment of cell identifiers such that—at least with respect to mobility related procedures— two possible target radio cells (with respect to one source radio cell) cannot be distinguished from each other. Hence, for the sake of simplicity, the description of the present invention is focused on the situation where the frequency band used by the second radio cell 12 is the same frequency band as the frequency band used by the third radio cell 13.

Within the mobile communication network 100, it should be assured that in a situation as represented in FIG. 1, the second and third radio cells 12, 13 are assigned different physical cell identifier information than the physical cell identifier information assigned to the first radio cell 11 (in case that the same center frequency is used as the one used by the first radio cell 11) as well as different physical cell identifier information with respect to each other (in case that the second and third radio cells 12, 13 use the same center frequency. In other words, in order to avoid a confusing situation that is potentially caused by the assignment of cell identifiers (and can, hence, be resolved by properly assigning the cell identifiers), the pair of the physical cell identifier information and the center frequency is different with respect to the first and second radio cells 11, 12, with respect to the first and third radio cells 11, 13, and—in case that their overlap with the first radio cell 11 is sufficiently strong—also with respect to the second and third radio cells 12, 13.

All radio cells use (or are assigned), respectively, a center frequency (ARFCNs) and a physical cell identifier information as well as unique cell global identifier information. Hence, the first radio cell 11 (i.e. the corresponding base station entity 111) as well as the second and third radio cells 12, 13 (i.e. the corresponding base station entities 112, 113) use, respectively, a center frequency (these frequencies or ARFCNs corresponding to at least two different frequency bands). Furthermore, physical cell identifier information as well as unique cell global identifier information is assigned, respectively, to the first, second, and third radio cell 11, 12, 13.

The present invention provides a network planning (by an assignment of physical cell identifier information) such that situations of PCI conflicts are avoided as much as possible. Even if this specification (i.e. to have a unique pair of PCI/ARFCN of the underlying network structures in the coverage area of a (source) radio cell) cannot be completely assured by the planning method in an exemplary embodiment, the probability to fulfill this specification can be significantly improved.

In the context of the present invention, the assignment of physical cell identifier information to the different radio cells is done in a network planning step. In such a network planning step, situations are considered where one of the radio cells 11, 12,13 serves, to a user equipment 20, as a potential source radio cell and one of the other radio cells serves as potential target radio cell with respect to a handover procedure of the user equipment 20 from the source radio cell to the target radio cell. As a consequence, such pairs of radio cells (i.e. one radio cell being the potential source radio cell and the other radio cell being the potential target radio cell) are considered according to the present invention. In this respect, the situation of one radio cell being the potential source radio cell and another radio cell being the potential target radio cell is to be distinguished from the situation where the same two radio cells are involved but with inversed rolls of source and target radio cell. These two situations (even though the same two radio cells are potentially involved) would be treated as being two different pairs of radio cells.

According to the present invention, the overlap between a pair of radio cells of different frequency bands (using different LTE-bands) is calculated via generating—for each of a plurality of coverage area elements 150 of the common radio coverage area 15—a set of handover likelihood information. The coverage area elements 150 may also be called geo-tiles and, collectively, cover the common radio coverage area 15. The set of handover likelihood information comprise an element of handover likelihood information for each pair of considered radio cells. These information are then used as an additional input criterion in order to assign the physical cell identifier information to the respective radio cells.

Figure 2:
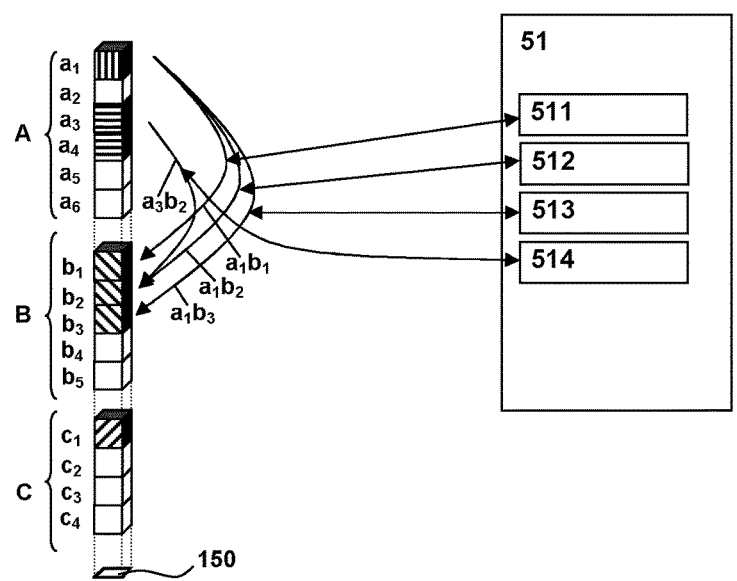
FIG. 2 schematically illustrates an exemplary embodiment of the inventive method for generating the set of handover likelihood information for a coverage area element.

In FIG. 2, an exemplary embodiment of the inventive method to generate the set of handover likelihood information 51 for a coverage area element 150 is schematically shown. The overlap between a given pair of two radio cells (one acting as potential source radio cell and the other acting as potential target radio cell) can be interpreted as describing the predicted area where potentially inter-frequency events (that lead in the following to a handover event) could be triggered. Due to the fact that, within the framework of typically used radio network planning tools—especially regarding the field-strength calculations—prediction errors need to be considered (even if tuned models are used such that actual measurements are taken into account), not exactly the same criteria (as a user equipment would use according to the LTE-RAN system configurations) can be used as criteria to assume that a handover involving a given pair of radio cells is likely or not. However, similar criteria (as those according to the LTE-RAN system configurations) can be used. Therefore, the present invention uses (within such network planning tools simulation tools of the radio environment in a certain geographical area) the handover criteria (especially field-strength-related criteria) according to the respective radio access network system configurations that would be applied in a real life scenario by real life user equipments and to adjust (or modify) these criteria by additional offsets, e.g. to correct the LTE system criteria with planning (tool) specific offsets that reduce the impact of the error of the path-loss or field-strength prediction model used by the respective planning tool.

In FIG. 2, for one coverage area element 150 (of the plurality of coverage area elements 150 schematically represented in FIG. 1) three groups of cubic elements are schematically shown, representing radio frequency bands A, B, C. The groups of cubic elements are labelled by reference signs A, B, and C and correspond, respectively, to different frequency bands, especially different frequency bands according to the LTE radio access technology. However, the present invention also refers to situations of combinations of radio access technology or to situations of other radio access technologies (than LTE), i.e. especially involving inter-RAT (radio access technology) handover events (i.e. handover event occurring between, e.g., a source radio cell using the LTE radio access technology, and a target radio cell using the UMTS radio access technology (or vice versa)) or involving handover events between UMTS radio cells where source and target radio cells use different UMTS radio frequencies.

Within each of the groups of cubic elements A, B, C, each cubic element schematically represents one radio cell a user equipment is potentially able to reach (or is able to be connected with). Group A of cubic elements (or the group of radio cells within frequency band A) comprises radio cells $a_1$, $a_2$, $a_3$, $a_4$, $a_5$, and $a_6$. Group B of cubic elements (or the group of radio cells within frequency band B) comprises radio cells $b_1$, $b_2$, $b_3$, $b_4$, and $b_5$, whereas Group C of cubic elements (or the group of radio cells within frequency band C) comprises radio cells $c_1$, $c_2$, $c_3$, and $c_4$. In a coverage area element 150, there might be radio cells that are not reachable by a user equipment 20. For the exemplary case of coverage area element 150 shown in FIG. 2, such radio cells that are not reachable by the user equipment 20 (or that are predicted (by the network planning tool) to provide an unsufficient signal strength level at the given coverage area element 150) or that are (or need) not to be considered for other reasons (than an unsufficient signal strength level at the considered coverage area element 150) are represented as white cubic elements (or cubic elements having unshaded faces).

According to the representation in FIG. 2, the exemplary situation is illustrated where radio cells $a_1$, $a_2$, $a_3$, $a_4$, $a_5$, and $a_6$ of radio frequency band A are potential source radio cells (or serving radio cells), and where the radio cells $b_1$, $b_2$, $b_3$, $b_4$, $b_5$, $c_1$, $c_2$, $c_3$, and $c_4$, of radio frequency bands B and C are potential target radio cells. Hence, radio frequency band A is also called the serving layer or the serving radio frequency band. Therefore, all the arrows illustrating potential pairs of radio cells (between the frequency bands A, B, and C) considered and exemplarily represented in FIG. 2 are starting at a radio cell of radio frequency band A and running to one of radio frequency bands B or C. These arrows are labelled as follows: a first arrow is labelled $a_1 b_1$, and running from radio cell $a_1$ as source radio cell to radio cell $b_1$ as target radio cell, a second arrow is labelled $a_1 b_2$, and running from radio cell $a_1$ as source radio cell to radio cell $b_2$ as target radio cell, a third arrow is labelled $a_1 b_3$, and running from radio cell $a_1$ as source radio cell to radio cell $b_3$ as target radio cell, and a fourth arrow is labelled $a_3 b_2$, and running from radio cell $a_3$ as source radio cell to radio cell $b_2$ as target radio cell. However, according to the present invention, additionally to the pairs of radio cells having their source radio cell among the radio cells of radio frequency band A, other pairs of radio cells, including pairs or radio cells having their source radio cells among radio frequency band B and having their target radio cells among radio frequency bands A or C (or having their source radio cells among radio frequency band C and having their target radio cells among radio frequency bands A or B) are possible to be considered according to the present invention (but not represented in FIG. 2).

In FIG. 2, three radio frequency bands A, B, C have been schematically shown in order to illustrate not only the comparatively straight forward case (of only two radio frequency bands). The exemplarily selection of handover relations considers a scenario with three available LTE layers (or UMTS layers or LTE/UMTS layers) with partly different thresholds/criterions for initiating handover events between radio cells.

In general, the analysis of the radio cells at a certain geo-tile (or coverage area element 150) per LTE frequency band (or in detail the center frequency) shall not be limited to the radio cell itself (i.e. the radio cell having the highest signal strength for the considered coverage area element 150). All radio cells of a frequency band within a configurable (signal strength) range (also called best radio cell (or best server) range, typically expressed in dB) shall be considered which fulfill a minimum coverage threshold (also called suitable criterion, typically in dBm). In addition, the number of servers per radio frequency band A, B, C might be limited (e.g. due to technical reasons, such as the needed computer memory or runtime to perform the analysis). All radio cells of a radio frequency band A at a geo-tile (i.e. a coverage area element 150) within a configurable first range below the best radio cell (e.g. maximum 3 dB below the best radio cell) of the geo-tile (or coverage area element 150) shall be analyzed in case that: their field-strengths are lower than a configurable threshold (such as, e.g. reference signal received power threshold being smaller or equal to −110 dBm (perhaps modified by an additional offset value) or better or equal than a configurable offset (or than the sum of the offset and a tool specific offset), e.g. 5 dB better or equal than the field-strength of the considered servers ($a_1$, $a_2$ . . . ) of radio frequency band A) but higher than a minimum RSFP (coverage/suitable)-threshold, e.g. −122 dBm. Radio cells of radio frequency band A that fulfill these conditions shall be compared again all radio cells of the second frequency band B (where again all radio cells shall be considered which are within a configurable second range of the best server of frequency band B but provide a better signal strength than a reference signal received power threshold (such as, e.g. reference signal received power threshold being greater or equal to −105 dBm (perhaps modified by an additional offset value) or better or equal than a configurable offset (or than the sum of the offset and a tool specific offset), e.g. 5 dB better or equal than the field-strength of the considered servers ($a_1$, $a_2$ . . . ) of radio frequency band A). This is exemplarily shown in FIG. 2 by means of the first, second, third and fourth arrow: radio cell $a_1$ (hatched vertically) of radio frequency band A is assumed to be the best radio cell (as serving or source radio cell) for coverage area element 150. Radio cells $a_3$ and $a_4$ (hatched horizontally and also within radio frequency band A) produce—at the considered coverage area element 150—a signal strength within the "best radio cell range" (such as at most −3 dB below the signal strength of radio cell $a_1$). Therefore, the potential handover scenarios of these three radio cells, acting as source radio cells, are considered (for calculating the overlap or the overlap score value within the considered coverage area element 150) against those potential target radio cells (hatched with inclined hatching lines) of the other radio frequency bands B, C that fulfill (at the considered coverage area element 150) the signal strength criterion (such as the reference signal received power being greater or equal −105 dBm or better or equal than a configurable offset (or than the sum of the offset and a tool specific offset), e.g. 5 dB better or equal than the field-strength of the considered servers ($a_1$, $a_2$ . . . ) of radio frequency band A) for successfully performing a handover event.

As already mentioned, the overlap between a pair of radio cells of different frequency bands (using different LTE-bands or radio frequency bands of a different radio access technology) is calculated via generating—for each of a plurality of coverage area elements 150 of the common radio coverage area 15—a set of handover likelihood information. In the right hand part of FIG. 2, the set of handover likelihood information 51 (for the considered coverage area element 150 and relating to the considered pairs of radio cells comprising radio cells of radio frequency band A as source radio cells) is schematically shown. In the exemplary representation shown in FIG. 2, the set handover likelihood information 51 comprises a plurality of elements 511, 512, 513, 514 of handover likelihood information 51. The first element 511 of handover likelihood information 51 relates to the pair of radio cells defined by the first arrow, being labelled $a_1b_1$, and running from radio cell at as source radio cell to radio cell $b_1$ as target radio cell. The second element 512 of handover likelihood information 51 relates to the pair of radio cells defined by the second arrow, being labelled $a_1b_2$, and running from radio cell $a_1$ as source radio cell to radio cell $b_2$ as target radio cell. The third element 513 of handover likelihood information 51 relates to the pair of radio cells defined by the third arrow being, labelled $a_1b_3$, and running from radio cell $a_1$ as source radio cell to radio cell $b_3$ as target radio cell. The fourth element 514 of handover likelihood information 51 relates to the pair of radio cells defined by the fourth arrow, being labelled $a_3b_2$, and running from radio cell $a_3$ as source radio cell to radio cell $b_2$ as target radio cell.

According to the present invention, the overall network performance and/or overall quality of service of a mobile communication network 100 is increased by intelligently assigning the physical cell identifier information to the plurality of radio cells that are reachable to a user equipment 20. In a first step, a set of handover likelihood information 51 comprising elements 511, 512, 513, 514 of handover likelihood information is calculated—based on information from a network planning tool—for each coverage area element 150. According to the present invention, it is preferred that these elements of handover likelihood information are preferably calculated only for situations that appear (from the perspective of the simulation data of the network planning tool used) as being relevant for real life user equipments 20 of the mobile communication network 100 involving inter-frequency band handover events. In a second step and regarding a specific pair of inter-frequency radio cells, the elements of handover likelihood information 51 corresponding to that specific pair of inter-frequency radio cells are considered for a plurality of coverage area elements 150—preferably for all coverage area elements 150 of the radio coverage area 15—and an overlap score value is calculated or generated, wherein the overlap score value is indicative of the overlap of the radio cells of the considered specific pair of radio cells.

As a result, for each such (relevant) pair of radio cells, an overlap score value exists and can be taken into consideration for assigning—in a third step—the physical cell identifier information to the respective radio cells involved, this assignment being conducted such that a comparatively large overlap score value of a given pair of radio cells indicates that these two radio cells should receive a different set (or pair) of physical cell identifier and center frequency and that other radio cells, having—as alternative target cells with the source cell of the given pair of radio cells—also a sufficiently large overlap with the source cell of the given pair of radio cells, should likewise receive a different set (or pair) of physical cell identifier and center frequency. The overlap score values of different pairs of radio cells are thus calculated and the available physical cell identifier information distributed among, preferably, the largest overlap score values determined among the different pairs of radio cells considered, i.e. the same pairs of physical cell identifier information and center frequency are assigned to radio cells that do only have a comparably low overlap score value mutually and with other radio cells linking these radio cells as source radio cells.

In case that, e.g., the value of the element of handover likelihood information related to a given pair of radio cells in a given coverage area element 150 is set at one unit value (especially in case that the considered coverage area elements 150 are to be treated equally, like, e.g., having the same or comparable surface area or size) in case that the signal strength calculations indicate that a real live user equipment 20 could or would have a chance of using this pair of radio cells in a handover event, the overlap score value corresponds to the physical or geographical overlap between the radio cells of the considered pair of radio cells (for the case of a user equipment being handed over from the source radio cell to the target radio cell of the considered pair of radio cells).

Regarding a coverage area element 150, the value of the element of handover likelihood information related to a given pair of radio cells can also differ from one unit value, e.g. it is preferred according to the present invention that the value of the element of handover likelihood information corresponds to the area of the coverage area element 150, e.g. expressed in square meters, or is optionally further weighted with individual factors. This means that, at a coverage area element 150 (or a tile or geo-bin) where the inter-frequency criterions are fulfilled—beside the selection criterion of the cells per frequency band—regarding the considered pair of radio cells (i.e. source- and target radio cell), the value of the element of handover likelihood information can be multiplied (weighted) by at least one of the following factors, including but not being limited to these weighting factors:
- (an indication related to) the amount (or the number) of users or user equipments or the density of users per geo-tile, i.e. in the coverage area element 150,
- (an indication related to) the amount of traffic or the density of traffic (either related to real time traffic and/or related to non-real time traffic) per geo-tile, i.e. in a coverage area element 150,
- (an indication of or related to) the (amount of) population per geo-tile, i.e. in the coverage area element 150,
- (an indication related to) the digital land usage in the coverage area element 150, especially the digital land-usage clutter class (DLU) specific factor,
- (an indication related to) the mobility of the users or user equipments at this geo-tile, i.e. in the coverage area element 150,
- a vector data set in the coverage area element 150 or an indication related to a tile crossing vector data set (e.g. street and/or motorway and/or train line)
- coverage area element 150 (or geo-tiles) covered by a specific type of mobile network radio cells (like a small cell) might be significantly stronger weighted as an overlapping element of a macro cell (e.g. factor 50).

Thus, the method applied according to the present invention is able to be implemented such that the value of the element of handover likelihood information related to a given pair of radio cells in a coverage area element 150 corresponds to a unit value, or to the area of the coverage area element 150 or to a value weighted by individual factors. Optionally, the value of the element of handover likelihood information related to a given pair of radio cells in a coverage area element 150 can be further weighted (i.e. independently alternatively or cumulatively to the other weighting factors mentioned) by its cell assignment probability, which can be considered if more than one cell of a frequency band covers or can be observed at a geo-tile (or coverage area element 150). Furthermore, for all geo-tiles (of coverage area elements 150) it shall be possible to set a DLU depend additional loss (of the radio signal) for simulating, e.g., indoor conditions which influences with its additional loss the suitable criterion of the considered radio cells.

Especially in a scenario of applying the value of the element of handover likelihood information related to a given pair of radio cells in a coverage area element 150 corresponding to a unit value, it is possible according to the present invention that a counter represents the overlap of the pair of radio cells (the counter counts the coverage area elements 150 where the above-mentioned field strength values (RSRP thresholds) are fulfilled), and the counter is increased by one unit value for each coverage area element 150 (or geo-tile) where this condition is fulfilled (for the considered pair of radio cells). The result of such a calculation of the overlap score value regarding a pair of radio cells can be interpreted as the size of the area of the serving (or source) cell itself, where the overlap conditions with the target cell are fulfilled, or the weighted area according to the above-mentioned weighting factors or the percentage of overlap or weighted overlap in relation to the total or weighted total coverage area of the source cell.

According to an alternative implementation of calculating the overlap score value, for a pair of radio cells which fulfill the above described overlap criterion at the considered geo-tile (or coverage area element 150), the difference between these radio cells is calculated. The difference of the radio cells is counted in a histogram for this combination (or pair) of radio cells. Based on such a histogram, the cumulative distribution function (CDF) of the overlap can be calculated.

Based on the calculated overlap (or overlap score value) for inter-frequency pairs of radio cells, the PCI planning or optimization algorithm takes this overlap-criterion as an additional restriction in the selection process of the physical cell identifier into account. Based on the manner of calculating the overlap calculation (or overlap score value), the criterion can, e.g., be:
- Two target radio cells (of, e.g., radio frequency band B) of the serving (or source) radio cell (from a different radio frequency band, e.g., radio frequency band A) with overlap values higher than a configurable threshold shall not be assigned the same physical cell identifier information.
- A target radio cell (of, e.g., radio frequency band B) of the serving (or source) radio cell (from, e.g., radio frequency band A) with an overlap value (or overlap score value) higher than a configurable threshold shall not have the same physical cell identifier information compared to a configured inter-frequency neighbor radio cell (i.e. another potential target radio cell) with the same radio frequency band as the considered target cell. Or in other words, in case that for a serving (or source) radio cell in, e.g., LTE1800 overlap values (or overlap score values) with two (potential target) radio cells of another radio frequency band (identical, e.g., for both these two radio cells) (e.g. LTE800) exist, which are higher than a configured overlap threshold, these two (potential target) radio cells have to be assigned with different physical cell identifier information by the physical cell identifier assignment algorithm.

Typically the assignment of physical cell identifier information is conducted such that at least two possible target radio cells—having the same frequency band (A, B, C) and being related to the same source radio cell—shall be assigned a different physical cell identifier information in case that the respective overlap score value exceeds a predetermined maximum allowed overlap score threshold and/or the sum of the respective overlap score values exceeds a predetermined maximum allowed overlap score threshold or the sum of the respective overlap score values exceeds a predetermined maximum allowed overlap score threshold, whereby each overlap score has to be larger than a further minimum threshold.

According to a further alternative embodiment of the present invention, and likewise based on the calculated overlap (or overlap score value) for inter-frequency pairs of radio cells, the PCI planning or optimization algorithm takes a mathematical algorithm for the purpose of physical cell identifier planning and or optimization, and calculates this according to an implemented mathematical cost-function whereby the overlap score is the input parameter or is a part of the input parameters of this cost-function.

In case that an inter-frequency neighbor relation exists between a serving radio cell (e.g. of the LTE1800 radio frequency band) and another radio cell of another LTE-band (e.g. LTE800), a still further radio cell of this latter LTE-band (in this case the LTE800 radio frequency band) shall not use the same physical cell identifier as the other radio cell if the overlap of the serving radio cell with the further radio cell is higher than a configured overlap threshold. In case of a considered inter-frequency neighbor relation, it is not mandatory that behind this relation also an overlap value higher than the threshold exists.

According to the present invention, the checking procedure and the re-assignment related to overlap violations can also be limited to new LTE radio cells or LTE radio cells with adopted parameters which influence the coverage area of such a cell (e.g. because of an adoption of the electrical tilt or transmission power) due to a possible trend of overestimation of the invented solution.

Dependent on the used assignment algorithm regarding physical cell identifier information, the criterion to use (or not to use) the same physical cell identifier in overlapping conditions (or radio cells) does not need to be, in every case, a hard threshold value, rather a penalty value can also be used instead, which would be again a part of the mathematical cost function of the optimization engine.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for improving overall network performance and/or overall quality of service of a mobile communication network by assigning physical cell identifier information to a plurality of radio cells, wherein the mobile communication network comprises a core network and an access network, the access network comprising the plurality radio cells, wherein the plurality of radio cells are at least partly overlapping, forming a common radio coverage area, each radio cell of the plurality of radio cells being associated with a respective base station entity of a plurality of base station entities, each radio cell of the plurality of radio cells using a center frequency, and a unique cell global identifier information being assigned to each radio cell of the plurality of radio cells, wherein the method comprises the following steps:

in a first step and for each of a plurality of coverage area elements of the common radio coverage area, generating a set of handover likelihood information—regarding possible inter-frequency handover events between at least part of the plurality of radio cells and based on an estimated radio signal quality corresponding to the considered coverage area element—each element of the set of handover likelihood information being indicative of a possibility and/or a likelihood of a handover of the user equipment from at least one possible source radio cell of the plurality of radio cells to at least one possible target radio cell of the plurality of radio cells, the at least one source radio cell and the at least one target radio cell having, respectively, center frequencies in different frequency bands;

in a second step, calculating, based on the elements of the sets of handover likelihood information—among the sets of handover likelihood information associated with the plurality of coverage area elements of the common radio coverage area—related to the at least one source radio cell and the at least one target radio cell, an overlap score value indicative of the overlap between the at least one source radio cell and the at least one target radio cell; and in a third step, assigning the physical cell identifier information to the at least one source radio cell and/or the at least one target radio cell dependent on the overlap score value;

wherein the set of handover likelihood information, generated with respect to a considered coverage area element of the common radio coverage area, comprises a weighting factor, the weighting factor being dependent on at least one out of the following:

an indication related to the amount or to the density of real time traffic in the coverage area element;

an indication related to the amount or to the density of non-real time traffic in the coverage area element;

an indication related to the digital land usage in the coverage area element;

an indication related to the mobility of the user equipments in the coverage area element;

a vector data set in the coverage area element related to a street and/or a motorway and/or a train line; or an indication related to the type of the source radio and/or to the type of the target radio cell and/or an indication related to the type of the relationship between the source and target radio cell.

2. The method according to claim 1, wherein the estimated radio signal quality—related to a considered coverage area element of the common radio coverage area—based on which the set of handover likelihood information is generated, corresponds to radio signal quality experienced by a user equipment in case it is located at or within the considered area element.

3. The method according to claim 1, wherein the possibility and/or the likelihood of a handover—related to a considered coverage area element of the common radio coverage area—from a possible source radio cell to a possible target radio cell of the plurality of radio cells is assumed to be verified if the estimated value of the reference signal received power (RSRP) verifies a reference signal received power being lower than or equal to −110 dBm for the possible source radio cell and a reference signal received power being higher than or equal to −105 dBm, or a reference signal received power being lower than or equal to the sum of a first offset value and −110 dBm for the possible source radio cell and a reference signal received power being higher than or equal to the sum a second offset value and −105 dBm.

4. The method according to claim 1, wherein the possibility and/or the likelihood of a handover—related to a considered coverage area element of the common radio coverage area—from a possible source radio cell to a possible target radio cell of the plurality of radio cells is assumed to be verified if the estimated value of the reference signal received power (RSRP) verifies a reference signal received power being lower than or equal to −110 dBm for the possible source radio cell and a reference signal received power of a possible target cell being higher than or equal to 5 dB of the reference signal of the possible source cell, or a reference signal received power being lower than or equal to the sum of a first offset value and 110 dBm for a possible source radio cell and a reference signal received power of a possible target cell being higher than or equal to the sum of a second offset value and 5 dB in relation to a reference signal of the possible source cell.

5. The method according to claim 1, wherein the possibility and/or the likelihood of a handover—related to a considered coverage area element of the common radio coverage area—from a possible source radio cell to a possible target radio cell of the plurality of radio cells is assumed to be verified if the estimated value of the reference signal received power (RSRP) verifies modified threshold conditions, wherein the modified threshold conditions are modified to reflect special radio signal quality influencing conditions, including an additional loss of radio signal quality due to indoor conditions within at least part of the considered coverage area element.

6. The method according to claim 1, wherein the weighting factor is further dependent on at least one out of the following:
the number of user equipments in the coverage area element;
an indication of the density of user equipments in the coverage area element in relation to the total amount of user equipments in the considered access network; or
an indication of the population or the density of population in the coverage area element.

7. The method according to claim 1, wherein for each of the plurality of coverage area elements, the set of handover likelihood information comprises at least one element of handover likelihood information related to the one radio cell of the plurality of radio cells, as a possible source radio cell, that has a highest estimated value of radio signal quality.

8. The method according to claim 1, wherein for each of the plurality of coverage area elements, the set of handover likelihood information comprises—additionally to the one element of handover likelihood information related to the one radio cell that has a highest estimated value of radio signal quality—at least one element of handover likelihood information related to a possible source radio cell of the plurality of radio cells if at least one of the following conditions are fulfilled:
the difference between the estimated value of radio signal quality related to the possible source radio cell of the plurality of radio cells compared to the highest estimated value of radio signal quality of a radio cell within the same frequency band is less than a predetermined threshold of radio signal quality; or
number of possible source radio cells within the same frequency band for which at least one element of handover likelihood information is generated does not exceed a predetermined threshold number.

9. The method according to claim 1, wherein different elements of handover likelihood information of a set of handover likelihood information—related to a considered coverage area element of the common radio coverage area—comprise a cell assignment probability weighting factor, the cell assignment probability weighting factor increasing or decreasing the respective overlap score value in case that more than one element of handover likelihood information is generated, for a considered coverage area element of the common radio coverage area, for radio cells within one frequency band.

10. The method according to claim 1, wherein assigning the physical cell identifier information to the at least one source radio cell and/or the at least one target radio cell dependent on the overlap score value further comprises assigning different physical cell identifier information to at least two possible target radio cells—having the same frequency band and being related to the same source radio cell in case that:
the respective overlap score value exceeds a predetermined maximum allowed overlap score threshold; and/or
the sum of the respective overlap score values exceeds a predetermined maximum allowed overlap score threshold; and/or
the sum of the respective overlap score values exceeds a predetermined maximum allowed overlap score threshold, whereby each overlap score has to be larger than a further minimum threshold; and/or
a mathematical algorithm for the purpose of physical cell identifier planning and or optimization calculates this according to an implemented mathematical cost-function whereby the overlap score is the input parameter or is a part of the input parameters of this cost-function.

11. A mobile communication network for improving overall network performance and/or overall quality of service by assigning a physical cell identifier information to a plurality of radio cells, wherein the mobile communication network comprises:
a core network; and
an access network, the access network comprising the plurality radio cells, wherein the plurality of radio cells are at least partly overlapping, forming a common radio coverage area, each radio cell of the plurality of radio cells being associated with a respective base station entity of a plurality of base station entities, each radio cell of the plurality of radio cells using a center frequency, and a unique cell global identifier information being assigned to each radio cell of the plurality of radio cells;

wherein the mobile communication network is configured to generate a set of handover likelihood information for each of a plurality of coverage area elements of the common radio coverage area—regarding possible inter-frequency handover events between at least part of the plurality of radio cells and based on an estimated radio signal quality corresponding to the considered coverage area element—each element of the set of handover likelihood information being indicative of a possibility and/or a likelihood of a handover of the user equipment from at least one possible source radio cell of the plurality of radio cells to at least one possible target radio cell of the plurality of radio cells, the at least one source radio cell and the at least one target radio cell having, respectively, center frequencies in different frequency bands;

wherein the mobile communications network is further configured to calculate, based on the elements of the sets of handover likelihood information—among the sets of handover likelihood information associated with the plurality of coverage area elements of the common radio coverage area—related to the at least one source radio cell and the at least one target radio cell, an overlap score value being indicative of the overlap between the at least one source radio cell and the at least one target radio cell; and wherein the mobile communications network is further configured to assign the physical cell identifier information to the at least one source radio cell and/or the at least one target radio cell dependent on the overlap score value;

wherein the set of handover likelihood information, generated with respect to a considered coverage area element of the common radio coverage area, comprises a weighting factor, the weighting factor being dependent on at least one out of the following:
an indication related to the amount or to the density of real time traffic in the coverage area element;
an indication related to the amount or to the density of non-real time traffic in the coverage area element;
an indication related to the digital land usage in the coverage area element;
an indication related to the mobility of the user equipments in the coverage area element;
a vector data set in the coverage area element related to a street and/or a motorway and/or a train line; or
an indication related to the type of the source radio and/or to the type of the target radio cell and/or an indication related to the type of the relationship between the source and target radio cell.

12. A non-transitory computer-readable medium having processor-executable instructions stored thereon for improving overall network performance and/or overall quality of service of a mobile communication network by assigning physical cell identifier information to a plurality of radio cells, wherein the mobile communication network comprises a core network and an access network, the access network comprising the plurality radio cells, wherein the plurality of radio cells are at least partly overlapping, forming a common radio coverage area, each radio cell of the plurality of radio cells being associated with a respective base station entity of a plurality of base station entities, each radio cell of the plurality of radio cells using a center frequency, and a unique cell global identifier information being assigned to each radio cell of the plurality of radio cells, wherein the processor-executable instructions, when executed, facilitate performance of the following steps:

in a first step and for each of a plurality of coverage area elements of the common radio coverage area, generating a set of handover likelihood information—regarding possible inter-frequency handover events between at least part of the plurality of radio cells and based on an estimated radio signal quality corresponding to the considered coverage area element—each element of the set of handover likelihood information being indicative of a possibility and/or a likelihood of a handover of the user equipment from at least one possible source radio cell of the plurality of radio cells to at least one possible target radio cell of the plurality of radio cells, the at least one source radio cell and the at least one target radio cell having, respectively, center frequencies in different frequency bands;

in a second step, calculating, based on the elements of the sets of handover likelihood information—among the sets of handover likelihood information associated with the plurality of coverage area elements of the common radio coverage area—related to the at least one source radio cell and the at least one target radio cell, an overlap score value indicative of the overlap between the at least one source radio cell and the at least one target radio cell; and in a third step, assigning the physical cell identifier information to the at least one source radio cell and/or the at least one target radio cell dependent on the overlap score value;

wherein the set of handover likelihood information, generated with respect to a considered coverage area element of the common radio coverage area, comprises a weighting factor, the weighting factor being dependent on at least one out of the following:
an indication related to the amount or to the density of real time traffic in the coverage area element;
an indication related to the amount or to the density of non-real time traffic in the coverage area element;
an indication related to the digital land usage in the coverage area element;
an indication related to the mobility of the user equipments in the coverage area element;
a vector data set in the coverage area element related to a street and/or a motorway and/or a train line; or
an indication related to the type of the source radio and/or to the type of the target radio cell and/or an indication related to the type of the relationship between the source and target radio cell.

* * * * *